United States Patent
Hazlewood et al.

(10) Patent No.: US 7,912,878 B2
(45) Date of Patent: Mar. 22, 2011

(54) METHOD FOR STORING MESSAGES IN A DIRECTORY

(75) Inventors: Kristin Marie Hazlewood, Austin, TX (US); Andy Hazlewood, Austin, TX (US); John Mark McConaughy, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/022,412

(22) Filed: Jan. 30, 2008

(65) Prior Publication Data

US 2009/0193013 A1 Jul. 30, 2009

(51) Int. Cl.
*G06F 17/30* (2006.01)
(52) U.S. Cl. ........................................ 707/828
(58) Field of Classification Search .................. 707/1, 5, 707/828; 713/1; 704/270.1
See application file for complete search history.

(56) References Cited

U.S. PATENT DOCUMENTS

| | | | | |
|---|---|---|---|---|
| 5,666,534 | A | * 9/1997 | Gilbert et al. | 713/1 |
| 6,745,192 | B1 | * 6/2004 | Libenzi | 1/1 |
| 2003/0096600 | A1 | 5/2003 | Lewis et al. | |
| 2004/0019487 | A1 | * 1/2004 | Kleindienst et al. | 704/270.1 |
| 2004/0102957 | A1 | * 5/2004 | Levin | 704/3 |
| 2006/0209868 | A1 | 9/2006 | Callaghan | |
| 2006/0276208 | A1 | * 12/2006 | Jain | 455/466 |
| 2007/0106630 | A1 | * 5/2007 | Fitzgerald et al. | 707/1 |

FOREIGN PATENT DOCUMENTS

WO 2006011641 A1 2/2006

\* cited by examiner

*Primary Examiner* — Etienne P LeRoux
(74) *Attorney, Agent, or Firm* — Garg Law Firm, PLLC; Rakesh Garg; Jeffrey S. LaBaw

(57) ABSTRACT

A method, system, and computer usable program product for storing messages in a directory executing in a data processing system are provided in the illustrative embodiments. A message is received over a network and identified in the directory. A base message entry that corresponds to the message is selected in a hierarchy of entries in the directory. A message instance entry for the message is created, such that the message instance entry becomes a child entry of the base message entry in the hierarchy.

23 Claims, 5 Drawing Sheets

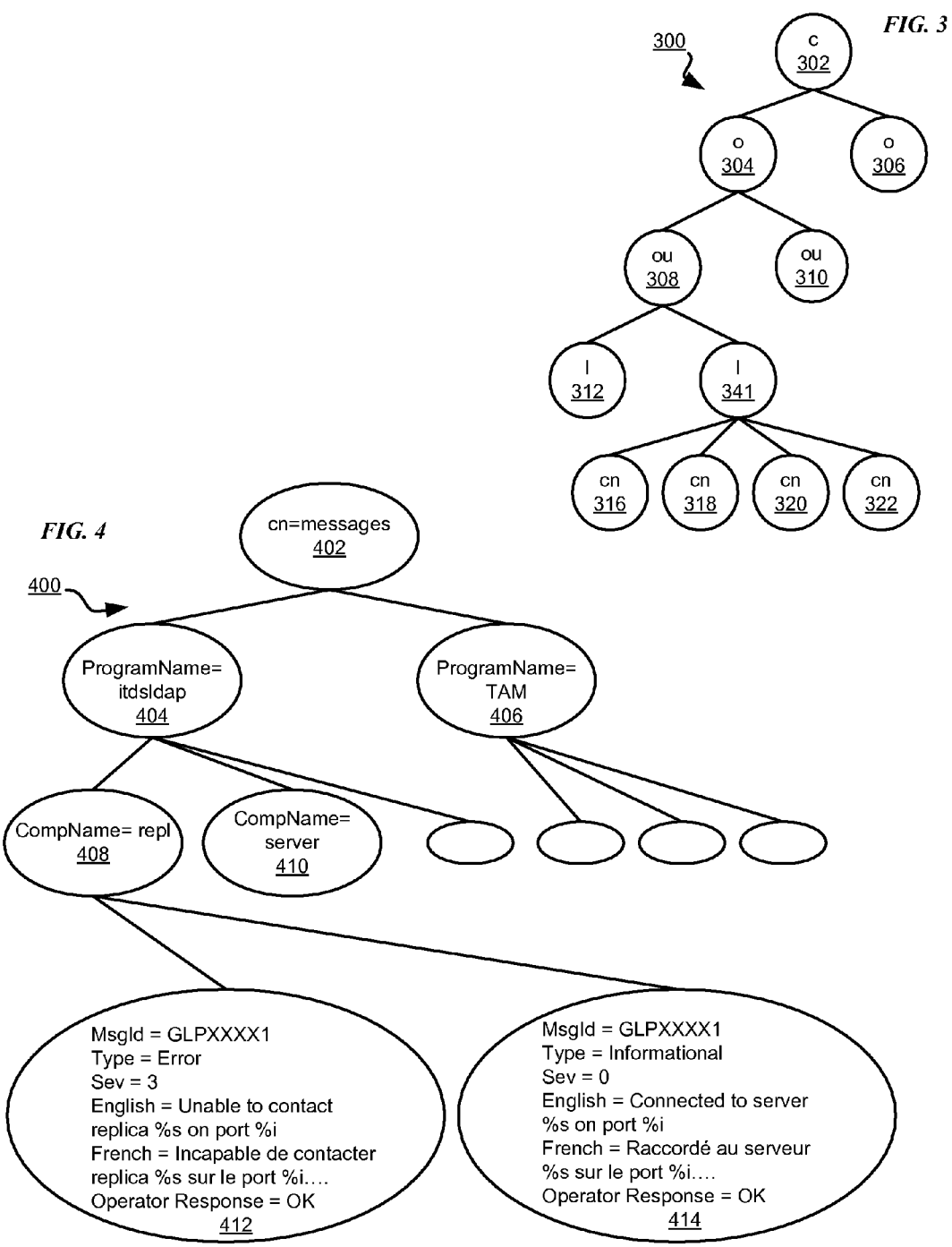

METHOD FOR STORING MESSAGES IN A DIRECTORY

BACKGROUND OF THE INVENTION

1. Field of the Invention

The present invention relates generally to an improved data processing system, and in particular, to a computer implemented method for managing data processing systems. Still more particularly, the present invention relates to a computer implemented method, system, and computer usable program code for storing messages in a directory.

2. Description of the Related Art

Software applications generate informative messages as they execute in a data processing system. A message is textual information that may include alphanumeric text, special characters, and symbols. Data processing system hardware also generate similar messages during their operation. These messages may inform a user about conditions in the hardware or software environment. The messages may also alert a user about events that may require the user's attention. An event is the occurrence of a specific condition in the hardware or software environment. An event may be intended or unintended and may generate one or more messages.

Users, such as system administrators, often receive these messages in text form. Often, the text of the messages is also saved in a log file so that a user may access the messages in the future. Generally, these log files are flat files. A log file can grow in size during the course of operation of the hardware and software that write the messages in the log file. As a result, the log file can include several messages from several sources, mixed together in the chronological order in which the messages were generated.

Certain hardware and software may also use the messages written by other hardware and software. For example, a document editor software application may receive a message posted by a network interface card that the network link is non-operational. The software application may use this message, such as to display a warning to the user that the document may not be saved over the network.

In addition several data processing environments have multiple hardware and software systems logging messages to different log files. In such data processing environments, a user or application may have to access several files to retrieve the messages contained in each of those files. The user or application may then have to combine the messages retrieved from the various files, such as in a chronological order, usually manually, to understand the complete context of the messages.

Furthermore, the hardware and software that log the messages, log them in a predetermined language. For example, the messages are often logged in English. Occasionally, the messages may appear in alternate languages in the log files. In those cases, the hardware and software generating those messages are programmed to generate the messages in the alternate language.

SUMMARY OF THE INVENTION

The illustrative embodiments provide a method, system, and computer usable program product for storing messages in a directory. A directory executes in a data processing system. The directory receives a message over a network and identifies the message. The directory selects a base message entry that corresponds to the message in a hierarchy of entries. The directory creates a message instance entry for the message, such that the message instance entry becomes a child entry of the base message entry in the hierarchy.

In identifying the message, the directory identifies one or more of an application that is the source of the message, a type of the message, and an identifier associated with a data processing system where the message originated.

In the hierarchy of entries, the base message entry includes several translations of a base message. Each translation is in a different language.

In the hierarchy, the message instance entry includes a set of substitution strings. A substitution string in the set of substitution strings modifies a part of the base message in the base message entry.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 3 depicts a block diagram of one hierarchical organization of exemplary user information presently used in LDAP directories;

FIG. 4 depicts a block diagram of a message hierarchy that can be implemented in a directory in accordance with an illustrative embodiment;

DETAILED DESCRIPTION OF THE PREFERRED EMBODIMENT

Figure 1:
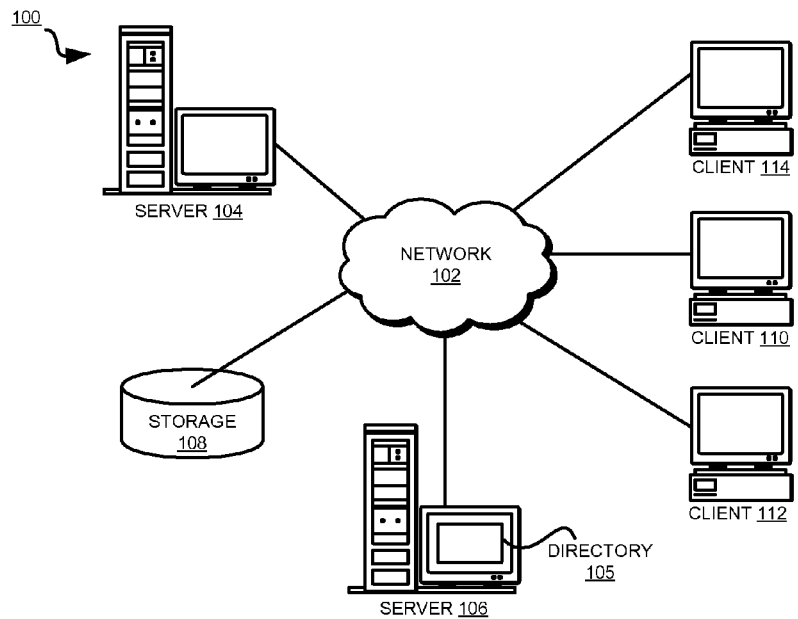
FIG. 1 depicts a pictorial representation of a network of data processing systems in which illustrative embodiments may be implemented.

Various components of a data processing environment, including hardware and software components, generate messages. These messages convey information to the users, such as system administrators. These messages are often logged in log files or otherwise stored in text for a user's review.

Illustrative embodiments recognize that messages generated and stored in this form are not conveniently searchable. For example, a log file containing thousands of messages is not conveniently searchable for similar content, similar timing, similar events, and many other criteria. Illustrative embodiments recognize that for searching beyond a simple text search, a user has to resort to a largely manual search process.

Illustrative embodiments further recognize that the messages stored in text form are generally stored in a predetermined language. In some instances, such as in Canada, messages may be logged in alternate languages, for example, in English and in French. Regardless, the designers of the software and hardware components predetermine the language of the messages, and program the language of the messages in the code of the software or hardware components.

Illustrative embodiments recognize that some users may prefer a language that is different from the language of the messages. For example, a system administrator in China managing a data processing environment in China may prefer to see the messages in Chinese instead of the messages in the default language—English. Users who prefer a different language than the language of the messages find it difficult to read, search, and analyze the messages.

The illustrative embodiments provide a method for storing messages in a directory, for example a directory server implementing the lightweight directory access protocol (LDAP). A directory is a hierarchical arrangement of information pertaining to users and systems in an organization. A directory server is a server in a data processing environment that provides a directory service. A directory service is a process by which a user in the data processing environment can retrieve details of a user or system from a directory server by providing a name of the user or system.

Directory servers may serve directories that are arranged according to a standard. One such standard is LDAP, which specifies a particular way of hierarchically organizing user information in a directory. A directory may be implemented using a standard, a variation of the standard, or by using a proprietary hierarchy. For example, the illustrative embodiments may be implemented using an X.500 directory server, which implements a directory standard of that name. The illustrative embodiments may also be implemented using a name server, or a user location service server (ULS server).

The method, system, and computer usable program code of the illustrative embodiments may be implemented using any hierarchically organized directory. The illustrative embodiments exemplarily use LDAP directory server for the clarity of the description but are not limited to LDAP directory server based implementations.

The illustrative embodiments provide a user with improved search and analysis capabilities that may solve the above-described problems and other problems related to storing, searching, understanding, and analyzing messages. Illustrative embodiments further provide a method for presenting the messages in any language of the user's choosing. In one example, storing messages in the manner of the illustrative embodiments may improve the response time to the events in a data processing environment due to the improved search and language capabilities that the illustrative embodiments provide. In another example, a user may be able to get a higher level view of the messages, for example, a global view of the messages across an entire data processing environment, grouped according to user-selected criteria.

The advantages listed above are only exemplary and are not intended to be limiting on the illustrative embodiments. Additional advantages may be realized by specific illustrative embodiments. Furthermore, a particular illustrative embodiment may have some, all, or none of the advantages listed above.

Figure 2:
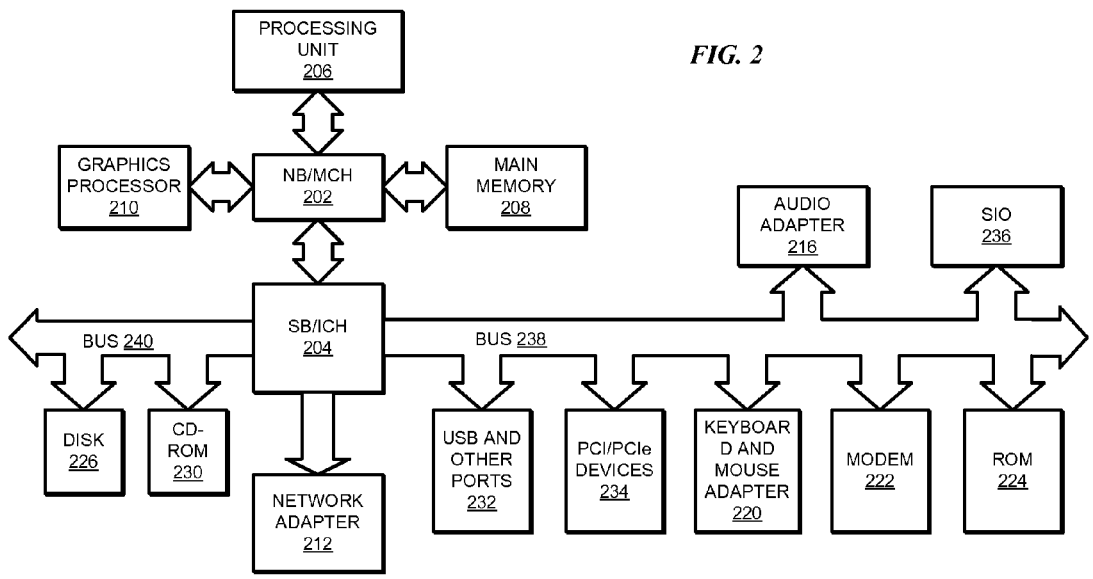
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Software applications may execute on any computer in data processing environment 100. In the depicted example, server 104 includes directory server 105, which may be a software server application, executing on server 104. Server 104 and server 106 couple to network 102 along with storage unit 108. In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment. A client server environment enables software applications and data to be distributed across a network such that an application functions by using the interactivity between a client data processing system and a server data processing system.

The interactivity between the clients and the servers in a client server environment may include data communications pertaining to messages. Data processing systems in data processing environment 100 may detect events in data processing environment 100 and communicate messages to each other. For example, an application executing on server 104 may generate a message that may be stored in a log file in storage 108.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of one hierarchical organization of exemplary user information presently used in LDAP directories. Hierarchy 300 may be implemented in an LDAP directory, such as directory 105 in FIG. 1.

Hierarchy 300 is the graphical depiction of how information may be organized in a directory. Hierarchy 300 includes nodes 302, 304, 306, 308, 310, 312, 314, 316, 318, 320, and 322. Nodes 302-322 in hierarchy 300 may have parent-child relationship with each other. The higher the level of a node in hierarchy 300, the larger the group of information the node represents. For example, node 302, a root node, has nodes 304 and 306 as children nodes. Similarly, node 314 has four children nodes, namely nodes 316, 318, 320, and 322.

Each node has an identifier that identifies the level of that node. For example, identifier "c" identifies node 302, representing that company-wide information is available by starting and traversing down hierarchy 300 from node 302. Identifier "o" identifies nodes 304 and 306, representing organization-wide information of two organizations within the company of node 302. Identifier "ou" identifies nodes 308 and 310, representing information pertaining to two organization units under the organization of node 304, under the company of node 302. Identifier "l" of nodes 312 and 314 indicates two levels, such as levels of employees, within the organization unit of node 308. Identifier "cn" of nodes 316-322 represents the common names of individual employees at the level of node 314.

Data existing at any node of the hierarchy is an entry in a corresponding directory, and is uniquely identified by the entry's distinguished name (dn). Distinguished name is a representation of the path in hierarchy 300 to that data. For example, the information of user John Doe may reside at node 316. The distinguished name for John Doe's entry in the directory represented by hierarchy 300 would be, "cn=John Doe, l=Manager, ou=North America Sales, o=Sales, c=ABC Widgets Corp.".

The parent-child relationship between a parent node and a child node corresponds to parent-child relationship between corresponding entries. An entry corresponding to a parent node becomes a parent entry, and an entry corresponding to a child node becomes a child entry. The identifiers of the nodes and the parent-child relationships between the nodes can be altered to match a particular organization's structure. An LDAP directory can then be implemented based on the resulting hierarchy using LDAP server applications.

With reference to FIG. 4, this figure depicts a block diagram of a message hierarchy that can be implemented in a directory in accordance with an illustrative embodiment.

Hierarchy 400 may be implemented in a directory such as directory 105 in FIG. 1. Starting at node 402, hierarchy 400 depicts the hierarchy for organizing messages in accordance with the illustrative embodiment. An implementation of the illustrative embodiment may create node 402 at any level in an already existing directory. Exemplary hierarchy 400 may therefore be only a partial view of the total hierarchy that a directory may implement.

In hierarchy 400, identifier "cn" that identifies node 402 may represent "class name". When a user searches for entries in the hierarchy 400, "cn=messages" portion to the distinguished name informs the directory to traverse to node 402. Additional portions of the distinguished name may inform the directory to find the additional information below node 402.

Nodes 404 and 406 with identifier "ProgramName" may represent the various applications, or software programs, whose messages may be stored in the directory under node 402. Here, node 404 stores information about a program called "itdsldap" and node 406 about a program called "TAM".

A software application may include several components. Each component may execute to provide some of the functions of the software application. A component of the software application executing in this manner may generate one or more messages. Several components of the program "itdsldap" identified in node 404 may execute in this manner and generate messages that may be stored in hierarchy 400. A user may be interested in knowing which component of the program generated a particular message. Identifier "CompName" identifies the names of the component stored at nodes 408 and 410. Nodes 408 and 410 identify two components of the "itdsldap" program. Of course, additional components may execute on additional computers. If additional components are executing, additional nodes may be added as children nodes to node 404.

An instance of program "itdsldap" of node 404 may have a component "repl" that may generate a variety of messages that can be stored at nodes 412 and 414. Node 412 and 414 may have an indentifier "MsgId" that may store unique values for each type of message. For example, node 412 may have a value "GLPxxxx1" for the MsgId identifier, and node 414 may have a value "GLPxxxx2" for the MsgId identifier.

Nodes 412 and 414 may have additional identifiers that may distinguish between the contents of nodes 412 and 414. For example, as depicted, node 412 and 414 each has the value "GLPxxxx1" for MsgId, but a second identifier—"type"—contains the value "Error" for node 412 and the value "Informational" for node 414. Thus the combination of the values of identifiers "MsgId" and "Type" make the contents of nodes 412 and 414 distinguishable from each other in their distinguished names.

Any number of identifiers may be added at any node in hierarchy 400. Nodes 412 and 414 show additional identifier "Sev" as an example. Identifier "Sev" may store a severity level of the messages stored under nodes 412 and 414.

As another example, nodes 412 and 414 may include another identifier "server" that may store a name of a computer. Because several instances of a program may be simultaneously executing on several computers, a user may be interested in knowing which instance of the program generated a particular message. An instance of a program is a copy of the program. Each instance of the program may generate messages separately. The additional identifier "server" in nodes 412 and 414 may inform the user about the name of the computer on which an instance of the program may have been running when that instance of the program generated a particular message.

Each of nodes 412 and 414 stores information that is called a base message node and includes a base message. A base message is a shell of a message that represents a group of messages. A single base message may represent many individual messages by including the features that are common to those individual messages. An individual message is also known as a message instance, a node corresponding to a message instance is a message instance node, and an entry corresponding to the message instance node is a message instance entry. For example, two message instances may read, "Error connecting to port 12", and "Error connecting to port 15". A base message for the two message instances may read, "Error connecting to port %i" where %i can be substituted with the exact port number to create each individual message.

Substituting parts of the base message in this manner results in the message instances that the base message represents. The value that replaces or substitutes a part of a base message is called a substitution string. A set of substitution strings is one or more substitution strings. In the above example, "12" substitutes "%i" to create the first message. Similarly, "15" substitutes "%i" to create the second message. Values "12" and "15" are examples of substitution strings. The operation of the substitution strings is described in more detail with respect to FIG. 5.

A base message may also include one or more language options. A language option is the availability of a copy the contents of the base message in a particular language. A base message translated in a particular language is called a translation of the base message, or simply, a translation. For example, the base message of node 412 includes two language options—English and French. An identifier "English" stores the English version of the base message, and an identifier "French" stores the French translation of the base message.

A language option may be specified in the distinguished name just as any other identifier described above. If a user includes the "French" identifier in a distinguished name to find a message under node 412, hierarchy 400 will deliver the French version of the base message with appropriate substitution strings. For example, a software application may have generated a message "Unable to contact replica 1 on port 12". A directory may store that message by creating a message instance under node 412. Assuming as an example that hierarchy 400 is implemented in an LDAP directory. If a user made a search request for that message, but wanted that message in French, the user may use the identifier "French" as "objectclass=*French" in searching for that message. The string "objectclass=*" acts as a filter. The string "French" is the requested attribute of the entry that corresponds to the message for which the user is performing the search. A filter is a criterion such that when the criterion in an entry has a value equal to the requested attribute, the filter delivers the entry in the result; otherwise, the filter omits the entry.

A search request is a request for searching the directory according to a set of search parameters. A search parameter is a criterion to be used in performing the search. For example, a search parameter may be a time of generating of the message, which may cause the search to return zero or more messages that match the time specified in the search parameter. As another example, a search parameter may specify a source of a message so that the search may return all messages generated by that source hardware or software.

A set of search parameters is one or more search parameters. A requested attribute in an LDAP directory is an example of a search parameter. Here, requested attribute "French" is a search parameter identifying a language.

In response to the user's exemplary search request above, a directory implementing hierarchy 400 may return "Incapable de contacter replica 1 sur le port 12". Thus, a user can retrieve a French translation of a message from hierarchy 400 even if a software application is not designed to generate the messages in French. Of course, the user may also receive other attributes from the returned entries depending on the search request.

A user, such as a system administrator, may add additional identifiers to any nodes as additional features are desired from a directory. Presently, methods exist for adding, deleting, or modifying identifiers in a directory's hierarchy. For example, a user can use an "ldif" stored file to modify identifiers in an LDAP directory.

Using existing methods, a user can modify the identifiers in the nodes of hierarchy 400. For example, the user can add additional language identifiers, such as "Japanese" at nodes 412 and 414. The user can then store the base message text translated in those languages in those nodes. The directory is then able to provide a Japanese version of the messages stored under nodes 412 and 414, without any change to the software application that generated those messages.

Figure 5:
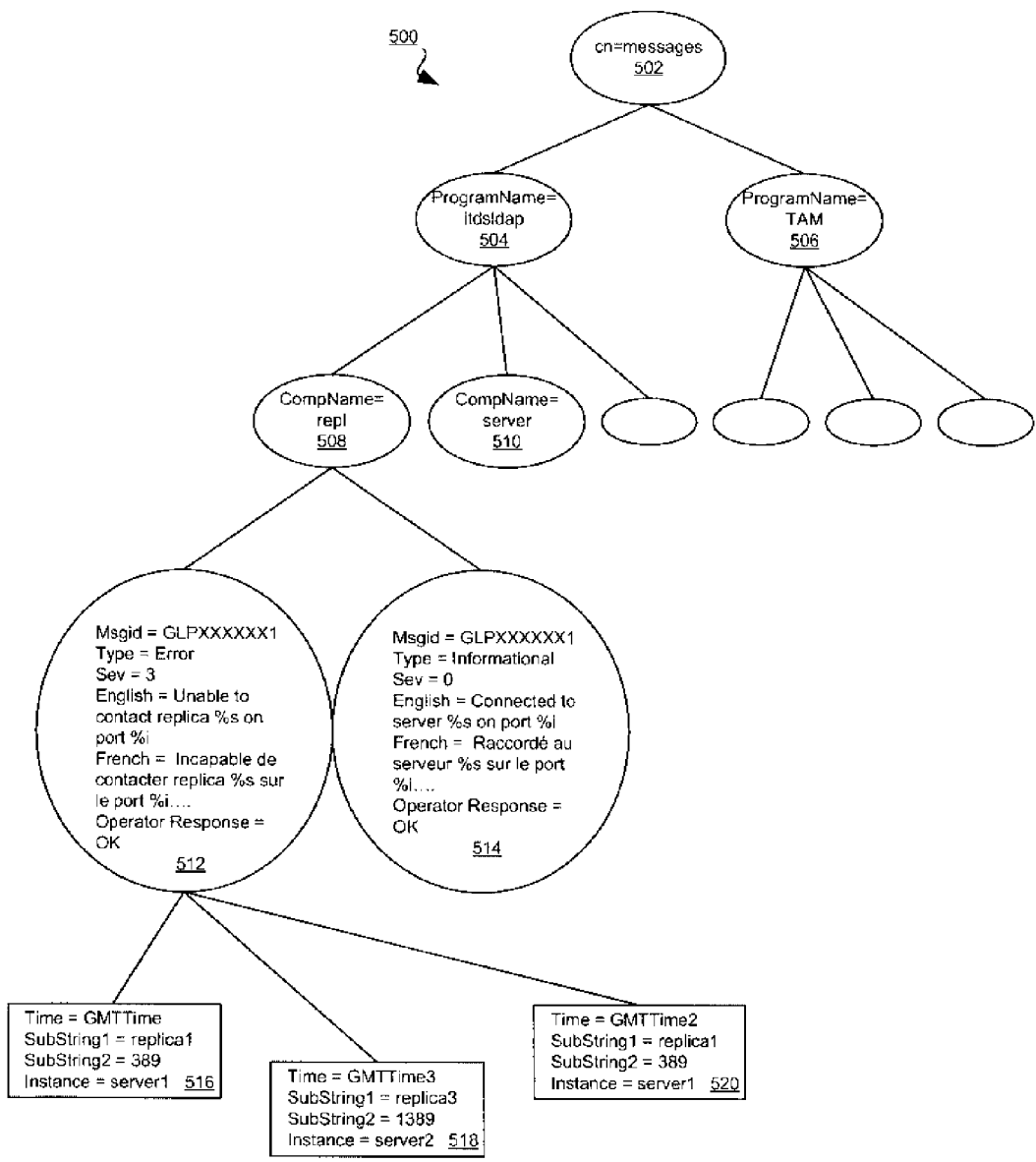
FIG. 5 depicts a block diagram of a message hierarchy including exemplary message instances in accordance with an illustrative embodiment.

With reference to FIG. 5, this figure depicts a block diagram of a message hierarchy including exemplary message instances in accordance with an illustrative embodiment. Hierarchy 500 may be implemented in a directory such as directory 105 in FIG. 1.

Hierarchy 500 depicts exemplary message instances stored under hierarchy 400 in FIG. 4. Node 502 is the same as node 402 in FIG. 4. Nodes 504 and 506 are the same as nodes 404 and 406 in FIG. 4. Nodes 508 and 510 are the same as nodes 408 and 410 in FIG. 4. Nodes 512 and 514 are the same nodes 412 and 414 in FIG. 4.

Nodes 516, 518, and 520 represent three exemplary message instances that have their common features abstracted into the base message in node 512. Any number of message instances can exist as nodes under a base message node.

The following description illustrates the operation of storing message instances in a directory implementing hierarchy 500. The description uses the message instance of node 516 as an example for this purpose.

A software application, "itdsldap" may have an instance of a component "repl" executing on a server "server1" that is located in GMT time zone. The software application may generate an "error" message that informs a user that the program was "unable to contact replica replica1 on port 389". Replica "replica1" may be another component of the software application.

A directory implementing hierarchy 500 may store this error message as follows—Because the directory is storing a "message", the directory stores the message under node 502, where the hierarchy for storing messages exists. Next, the directory identifies the source of the message as being the "itdsldap" program. Hierarchy 500 stores messages from that program under node 504. The directory determines that the message is from the component "repl" of program "itdsldap". The directory then traverses another level down from node 504 in hierarchy 500 and Hierarchy 500 stores messages from the component "repl" under node 508.

Evaluating the contents of the message, the directory determines that the message is an "error" message, having MsgId "GLPxxxx1". In one embodiment, instead of, or in addition to, matching the MsgId, a directory may match the text of a message with the base message of node 512. In another embodiment, the directory may match or compare other identifiers in a message instance with the identifiers in the base message nodes in order to store the message instance under that base message node. The directory then creates message instance node 516 under node 512.

As an example, assume that hierarchy 500 is implemented in an LDAP directory. When a user searches for all the error messages from the program "itdsldap", the user may specify a distinguished name according to the LDAP convention. For example, the distinguished name for searching for the error message would be "ldapsearch-b CompName=repl, ProgramName=itdsldap, cn=messages". The contents of all the children nodes of each of base message nodes 512 and 514 are combined with the contents of the respective base message nodes to recreate all the stored messages from the software application "itdsldap".

As another example, a user may search for a specific error message from the program "itdsldap". For example, the user may want to search for the error message described above. The user may specify a distinguished name according to the LDAP convention to search for this particular message. For example, the distinguished name for searching for the error message would be "ldapsearch-b CompName=repl, ProgramName=itdsldap, cn=messages, MsgId=GLPxxx1".

The contents of message instance nodes 516, 518, and 520 are combined with the contents of base message node 512 to recreate all the stored error messages. For example, in one embodiment, the directory may return the error messages sorted by timestamps of each message because the directory stores the "Time" identifier in this exemplary hierarchy. In another embodiment, the directory may return all the messages in French if the user has also specified the filter and requested attribute "objectclass=*French". In another embodiment, the directory may return other translations if available in response to the user specifying different languages in the distinguished name. In another embodiment, the directory may return only the error messages that originated from server1, sorted in chronological order, in French language.

In another example, an illustrative embodiment may make a software application aware that the messages are going to be stored in a directory. Consequently, the software application may not generate the entire message but only a set of substitution strings. For example, in accordance with the illustrative embodiment, the "repl" component of "itdsldap" application may generate a message that may resemble "MsgId=GLPxxx1, Time=GMT, SubString1=replica1, SubString2=389, Instance=Server1". The directory may store the message instance as message instance node 516. A user queries the directory to find out if component "repl" has generated any error messages. The user may specify the distinguished name of the error messages the user is interested in as "ldapsearch-b CompName=repl, ProgramName=itdsldap, cn=messages, MsgId=GLPxxx1".

In one embodiment, the user may specify the various identifiers in any order in a distinguished name. In another embodiment, the user may specify alternate, additional, variant, or combined identifiers instead of those used in this example. In another embodiment, the user may specify an identifier by which to sort the resulting entries. In another embodiment, the user may specify a language in which to return the resulting entries.

Many other combinations of identifiers, and many other orders, selections, and languages of the entries will be conceivable from the description of the illustrative embodiments. For example, if an error in one program occurs at 10:00 AM, by using the illustrative embodiments the user can find out what other messages were generated at approximately that time.

Figure 6:
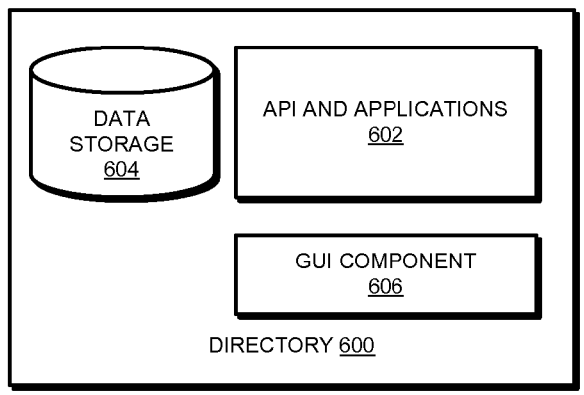
FIG. 6 depicts a block diagram of components of a directory in accordance with an illustrative embodiment.

With reference to FIG. 6, this figure depicts a block diagram of components of a directory in accordance with an illustrative embodiment. Directory 600 may be implemented as directory 105 in FIG. 1. Directory 600 implements hierarchies, such as hierarchy 500 in FIG. 5.

Directory 600 may include application programming interfaces (API) and applications that are presently available with directories. API and applications 602 may be such APIs and applications. Directory 600 may store the directory information in data storage 604. Data storage 604 may store the directory information in any suitable form. For example, data storage 604 may store the directory information as a rational database, an object oriented database, a flat file, or an index file.

Figure 7:
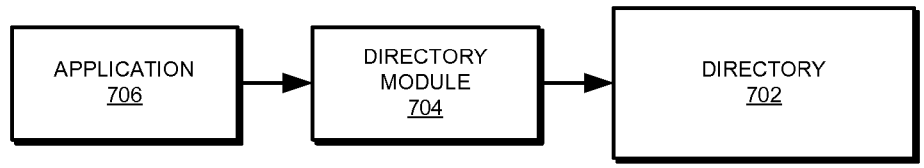
FIG. 7 depicts a block diagram of an application writing messages to a directory in accordance with an illustrative embodiment.
Figure 8:
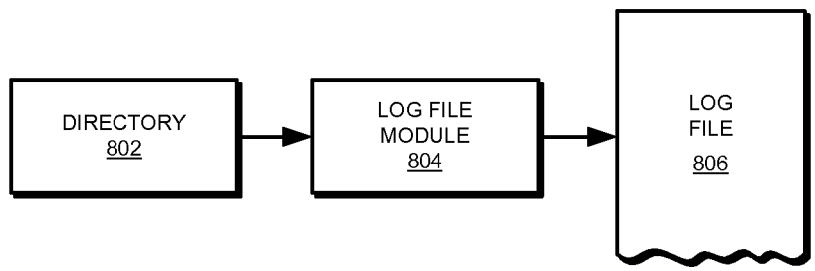
FIG. 8 depicts a block diagram of a directory writing messages to a log file in accordance with an illustrative embodiment.

Directory 600 may also include graphical user interface (GUI) component 606. Graphical user interface component 606 may provide a user a graphical method for accessing the messages stored in the directory. For example the user may user graphical user interface component 606 to create search queries, select queries from pre-formed search queries for common searches. The user may also be able to organize, rearrange, or further process the entries that result from the search, using graphical user interface component 606. The depicted components of directory 600 may take additional forms and support additional or different functions in particular implementations without departing from the scope of the illustrative embodiments. FIGS. 7 and 8 depict some examples of these components and their functions.

With reference to FIG. 7, this figure depicts a block diagram of an application writing messages to a directory in accordance with an illustrative embodiment. Directory 702 may be implemented using directory 600 in FIG. 6.

Directory module 704 may be an API or a directory application, such as one of API and applications 602 in FIG. 6. Application 706 may be any software application, any hardware, or any combination thereof, that generates messages.

A software developer may make application 706 aware of directory 702 by programming application 706 to use directory module 704 to write messages. Application 706 may then generate messages, pass the messages to directory module 704, which may create an entry in directory 702 for the message. Directory 702 may record the message as a directory entry in the manner described above with respect to FIG. 5.

By implementing the illustrative embodiment of FIG. 7, application 706 may not have to generate the full text of each message, but only the substitution strings that modify a base message. For example, application 706 may generate only a message ID, a port number, and a component name in a message. Directory 702 may record the message in a manner similar to message instance node 516 in FIG. 5.

With reference to FIG. 8, this figure depicts a block diagram of a directory writing messages to a log file in accordance with an illustrative embodiment. Directory 802 may be implemented using directory 600 in FIG. 6.

Log file module 804 may be one of API and applications 602 in FIG. 6. In certain data processing environments, users may still need a log file of messages in addition to storing the messages in directory 802. Log file module 804 may execute a preformed search in directory 802 to generate the messages stored in directory 802. The search may result in all the messages or only some of the messages stored in directory 802 according to the user's needs. Log file module 804 may then write the resulting messages in log file 806. Log file 806 may be a flat file of messages, or any suitable organization of the messages depending on the particular implementation. For example, log file module may receive the search results and convert them to database entries for inserting in a log file database.

Figure 9:
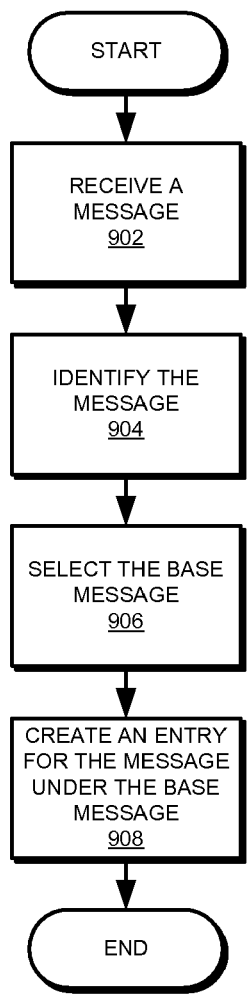
FIG. 9 depicts a flowchart of a process of storing messages in a directory in accordance with an illustrative embodiment.

With reference to FIG. 9, this figure depicts a flowchart of a process of storing messages in a directory in accordance with an illustrative embodiment. Process 900 may be implemented in a directory, such as directory 600 in FIG. 6.

The process begins by receiving a message (step 902). The process identifies the message (Step 904). In performing step 904, the process may determine the source of the message, the type of the message, the time of the message, the data processing system parameters associated with the message, other identifiers associated with the message, or any combination thereof. Some examples of these determinations are provided above with respect to the examples in the description of FIG. 5.

The process selects a base message entry corresponding to a base message node, such as base message node 512 in FIG. 5 (step 906). The base message entry is the entry that corresponds to the base message node. The process selects the base message entry based on the identification of step 904. The process creates an entry for the message, such as message instance node 516 in FIG. 5 (step 908). The process ends thereafter.

Figure 10:
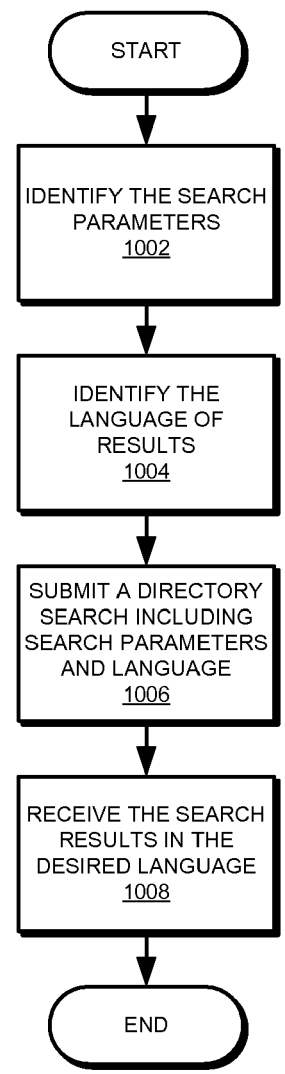
FIG. 10 depicts a flowchart of a process of returning searched messages in a user-desired language in accordance with an illustrative embodiment.

With reference to FIG. 10, this figure depicts a flowchart of a process of returning searched messages in a user-desired language in accordance with an illustrative embodiment. Process 1000 may be implemented in a directory, such as directory 600 in FIG. 6.

Process 1000 begins by identifying the search parameters specified in a search query (step 1002). The search query may be a distinguished name search in a directory, and may specify the search parameters in the form of identifiers in a distinguished name. The process also identifies a desired language of the results (step 1004). A user may specify the desired language of the messages in the distinguished name search as well. Some examples of the identifiers and language specification in exemplary distinguished names have been provided in the description of FIG. 5.

The process submits the search query including the search parameters and the language preference, if specified, to the directory (step 1006). The process receives the search results in the desired language (step 1008). The search results are the messages that have been translated in the desired language, if such translation is available in the directory. If the translation in the desired language is not available in the directory, the search results may include translations in a default language, such as English. A translation in a default language is called a default language translation. If a desired language is not specified in the search, the search results may be in the default language. The process ends thereafter.

Figure 11:
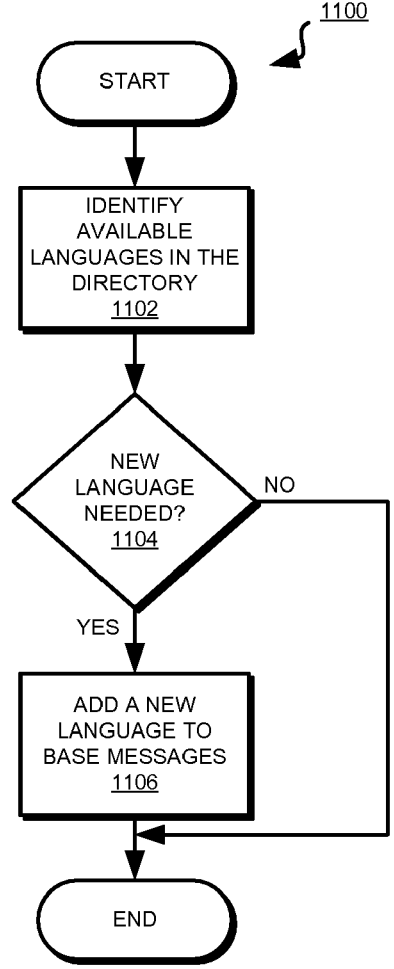
FIG. 11 depicts a flowchart of a process of adding additional language translations to a directory in accordance with an illustrative embodiment.

With reference to FIG. 11, this figure depicts a flowchart of a process of adding additional language translations to a directory in accordance with an illustrative embodiment. Process 1100 may be implemented in a directory, such as directory 600 in FIG. 6.

Process 110 begins by identifying available languages in a directory (step 1102). The process then determines if a new language has to be added to the directory (step 1104). If the process determines that a new language has to be added ("Yes" path of step 1104), the process adds the new language to the entries representing the base messages (step 1106). The process ends thereafter. If the process determines that a new language is not to be added, such as when a language already exists in the directory ("No" path of step 1104), the process ends thereafter as well.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for storing messages in a directory. By implementing the illustrative embodiments, users may store messages generated by hardware and software into a directory. The user can then search the directory in a more efficient way as compared to the traditional log file of messages.

The user can search for messages by specific criteria, such as the times of the messages, the sources of the messages, the nature of the messages, and any other criteria the user may desire. In addition, the user may retrieve the messages in a language of the user's choice from the directory, without having to modify the software and hardware that generated those messages.

Furthermore, developers may be able to program new software and hardware to generate messages with the awareness that the messages may be stored in a directory. Directory-aware messages, to wit, messages generated for storing in a directory, may be more compact that full text messages. Consequently, generating directory-aware messages may be more efficient as compared to generating full text messages.

In addition, using the illustrative embodiments, a user may be able to support legacy applications that may still require a log file of messages by generating the log file from the directory.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for storing messages in a directory, the method comprising:
   receiving, over a network, a message at the directory for storing in the directory, the directory being accessed according to a directory access protocol, the directory executing in an electronic data processing system;
   identifying the message in the directory;
   selecting a base message entry corresponding to the message in a hierarchy of entries in the directory, wherein the base message entry includes a plurality of translations of a base message in a plurality of languages; and
   creating a message instance entry for the message, the message instance entry being a child entry of the base message entry in the hierarchy in the directory.

2. The method of claim 1, wherein identifying the message includes identifying at least one of an application that is the source of the message, a type of the message, and an identifier associated with a data processing system where the message originated.

3. The method of claim 1, wherein the message instance entry includes a set of substitution strings, wherein a substitution string in the set of substitution strings modifies a part of the base message in the base message entry.

4. A method for using messages stored in a directory, the method comprising:

receiving, over a network, a search request in the directory for a message stored in the directory, the directory being accessed according to a directory access protocol, the directory executing in an electronic data processing system;

identifying in the directory, a set of search parameters in the request, the set of search parameters including a parameter identifying a language;

selecting a message instance entry from a hierarchy in the directory using the set of search parameters;

selecting a translation of a base message in the language in a base message entry for the message instance entry in the hierarchy, wherein the base message entry includes a plurality of translations of the base message in a plurality of languages; and delivering, responsive to the request, the translation of the base message for the message instance entry.

5. The method of claim 4, further comprising:

modifying, in the directory, the translation of the base message using a set of substitution strings from the message instance entry.

6. The method of claim 5, wherein modifying the translation includes modifying a default language translation if the translation in the language is not available in the base message entry.

7. The method of claim 4, wherein selecting the translation includes selecting a default language translation if the translation in the language is not available in the base message entry, and wherein delivering includes delivering the default language translation.

8. The method of claim 4, wherein the set of search parameters includes a second parameter identifying one of a time of a message and a source of a message.

9. The method of claim 4, wherein the search request is for a plurality of messages.

10. The method of claim 4, wherein if the translation in the language is not available in the base message entry, the method further comprising:

adding a new translation in the language to the base message entry in the directory.

11. A data processing system for storing messages in a directory, the data processing system comprising:

a storage device, wherein the storage device stores computer usable program code; and a processor, wherein the processor executes the computer usable program code, and wherein the computer usable program code comprises:

computer usable code for receiving over a network, a message at the directory for storing in the directory, the directory being accessed according to a directory access protocol, the directory executing in a data processing system;

computer usable code for identifying the message in the directory;

computer usable code for selecting a base message entry corresponding to the message in a hierarchy of entries in the directory, wherein the base message entry includes a plurality of translations of a base message in a plurality of languages; and computer usable code for creating a message instance entry for the message, the message instance entry being a child entry of the base message entry in the hierarchy.

12. The data processing system of claim 11, wherein the computer usable code for identifying the message includes computer usable code for identifying at least one of an application that is the source of the message, a type of the message, and an identifier associated with a data processing system where the message originated.

13. The data processing system of claim 11, wherein the message instance entry includes a set of substitution strings, wherein a substitution string in the set of substitution strings modifies a part of the base message in the base message entry.

14. A computer usable program product comprising a computer usable non-transitory storage medium including computer usable code for using messages stored in a directory, the computer usable code comprising:

computer usable code for receiving, over a network, a search request for a message stored in the directory, the directory being accessed according to a directory access protocol, the directory executing in a data processing system;

computer usable code for identifying in the directory, a set of search parameters in the request, the set of search parameters including a parameter identifying a language;

computer usable code for computer usable code for selecting a message instance entry from a hierarchy in the directory using the set of search parameters;

computer usable code for selecting a translation of a base message in the language in a base message entry for the message instance entry in the hierarchy, wherein the base message entry includes a plurality of translations of the base message in a plurality of languages; and computer usable code for delivering, responsive to the request, the translation of the base message for the message instance entry.

15. The computer usable program product of claim 14, further comprising:

computer usable code for modifying the translation of the base message using a set of substitution strings from the message instance entry, wherein the computer usable code for modifying the translation includes computer usable code for modifying a default language translation if the translation in the language is not available in the base message entry.

16. The computer usable program product of claim 14, wherein the computer usable code for selecting the translation includes computer usable code for selecting a default language translation if the translation in the language is not available in the base message entry, and wherein the computer usable code for delivering includes computer usable code for delivering the default language translation.

17. The computer usable program product of claim 14, wherein the set of search parameters includes a second parameter identifying one of a time of a message and a source of a message, and wherein the search request is for a plurality of messages.

18. The computer usable program product of claim 14, wherein if the translation in the language is not available in the base message entry, the computer usable program product further comprising:

computer usable code for adding a new translation in the language to the base message entry in the hierarchy.

19. The computer usable program product of claim 14, wherein the computer usable code is stored in a computer readable storage medium in a data processing system, and wherein the computer usable code is downloaded over a network from a remote data processing system.

20. A computer usable program product comprising a computer usable non-transitory storage medium including computer usable code for storing messages in a directory, the computer usable code comprising:

computer usable code for receiving over a network, a message at the directory for storing in the directory, the directory being accessed according to a directory access protocol, the directory executing in a data processing system;

computer usable code for identifying the message in the directory;

computer usable code for selecting a base message entry corresponding to the message in a hierarchy of entries in the directory, wherein the base message entry includes a plurality of translations of a base message in a plurality of languages; and computer usable code for creating a message instance entry for the message, the message instance entry being a child entry of the base message entry in the hierarchy.

21. The computer usable program product of claim 20, wherein the computer usable code for identifying the message includes computer usable code for identifying at least one of an application that is the source of the message, a type of the message, and an identifier associated with a data processing system where the message originated.

22. The computer usable program product of claim 20, wherein the message instance entry includes a set of substitution strings, wherein a substitution string in the set of substitution strings modifies a part of the base message in the base message entry.

23. The computer usable program product of claim 20, wherein the computer usable code is stored in a computer readable storage medium in a server data processing system, and wherein the computer usable code is downloaded over a network to a remote data processing system for use in a computer readable storage medium with the remote data processing system.

* * * * *